United States Patent
Zare (10) Patent No.: US 10,122,165 B2
(45) Date of Patent: Nov. 6, 2018

(54) APPARATUS AND METHOD FOR REDUCING HARMONICS

(71) Applicant: Danfoss Power Electronics A/S, Graasten (DK)

(72) Inventor: Firuz Zare, Egernsund (DK)

(73) Assignee: Danfoss Power Electronics A/S, Graasten (DK)

( * ) Notice: Subject to any disclaimer, the term of this patent is extended or adjusted under 35 U.S.C. 154(b) by 331 days.

(21) Appl. No.: 14/916,219

(22) PCT Filed: Sep. 29, 2014

(86) PCT No.: PCT/IB2014/064925
§ 371 (c)(1),
(2) Date: Mar. 3, 2016

(87) PCT Pub. No.: WO2015/056122
PCT Pub. Date: Apr. 23, 2015

(65) Prior Publication Data
US 2016/0197473 A1    Jul. 7, 2016

(30) Foreign Application Priority Data

Oct. 14, 2013   (EP) .................................... 13188438

(51) Int. Cl.
*H02J 3/00*        (2006.01)
*H02M 1/42*        (2007.01)
(Continued)

(52) U.S. Cl.
CPC .................. *H02J 3/00* (2013.01); *H02J 3/01* (2013.01); *H02M 1/12* (2013.01); *H02M 1/4216* (2013.01);
(Continued)

(58) Field of Classification Search
CPC ...................................... H02J 3/00; H02J 3/01
(Continued)

(56) References Cited

U.S. PATENT DOCUMENTS

| 5,625,543 A | 4/1997 | Barrett |
| 5,923,550 A | 7/1999 | Kumar |

(Continued)

FOREIGN PATENT DOCUMENTS

| CN | 101068099 A | 11/2007 |
| CN | 101789707 A | 7/2010 |

(Continued)

OTHER PUBLICATIONS

Alves et al; "A Novel Unidirectional Hybrid Three-Phase Rectifier System Employing Boost Topology", Power Electronics Specialists Conference, 2005. PESC '05. IEEE 36th, IEEE, Piscataway, NJ, USA; Jun. 16, 2005, pp. 487-493.*

(Continued)

*Primary Examiner* — Thomas Skibinski
(74) *Attorney, Agent, or Firm* — McCormick, Paulding & Huber LLP (57) ABSTRACT

The present invention provides systems and methods for reducing harmonics, for example when using an AC to AC converter to drive a load such as a motor drive. In a first embodiment, a plurality of load driving circuits is provided, each drawing current from a 3-phase AC supply and driving an AC load, wherein each of said load driving circuit includes a 3-phase rectifier, with the rectifiers of the load driving circuits being controlled such that the rectification of the AC supply by the load driving circuits is staggered. In a second embodiment, a load driving circuit comprises an electronic inductor configured to control the DC link voltage and/or current such that the current drawn from the AC (Continued)

supply by the load driving circuit has a stepped profile. The first and second embodiments may be combined.

17 Claims, 4 Drawing Sheets

(51) Int. Cl.
*H02J 3/01* (2006.01)
*H02M 1/12* (2006.01)
*H02M 5/458* (2006.01)

(52) U.S. Cl.
CPC ......... *H02M 1/4225* (2013.01); *H02M 5/458* (2013.01); *Y02B 70/126* (2013.01); *Y02E 40/40* (2013.01)

(58) Field of Classification Search
USPC .............................................. 307/31; 363/89
See application file for complete search history.

(56) References Cited

U.S. PATENT DOCUMENTS

| | | | |
|---|---|---|---|
| 6,137,700 A | 10/2000 | Iida et al. | |
| 6,567,283 B2 | 5/2003 | Welches | |
| 7,208,911 B1 | 4/2007 | Kumar et al. | |
| 2009/0206902 A1* | 8/2009 | Li | H02M 1/4225 327/176 |

FOREIGN PATENT DOCUMENTS

| | | |
|---|---|---|
| CN | 102916440 A | 2/2013 |
| DE | 10 2008 002 971 A1 | 1/2009 |
| EP | 1 120 897 A2 | 8/2008 |
| WO | 2005/056342 A1 | 6/2005 |

OTHER PUBLICATIONS

"Product Information Sheet: Drive Tamer" Mirus International Inc. Brampton, Ontario, Canada. Jan. 6, 2010. pp. 1-11.

"Phase Shifting: An Alternative Solution to Harmonic Problems" David Burger. Tappi Journal vol. 78, No. 8. Aug. 1995. pp. 67-69.

European Search Report for European Application No. EP 13 18 8438 dated Jan. 29, 2014.

Yongsug Suh et al: "A Comparative Study of Medium-Voltage Power Converter Topologies for Plasma Torch Under Dynamic Operating Conditions", IEEE Transactions on Industrial Electronics, IEEE Service Center, Piscataway, NJ, USA, vol. 56, No. 6, Jun. 3, 2009, pp. 2150-2161.

International Search Report for PCT Serial No. PCT/IB2014/064925 dated Feb. 17, 2015.

* cited by examiner

APPARATUS AND METHOD FOR REDUCING HARMONICS

CROSS-REFERENCE TO RELATED APPLICATIONS

This application is entitled to the benefit of and incorporates by reference subject matter disclosed in the International Patent Application No. PCT/IB2014/064925 filed on Sep. 29, 2014 and European Patent Application No. 13188438 filed on Oct. 14, 2013.

TECHNICAL FIELD

The present invention relates to the reduction of harmonics in power supply systems that are caused, for example, when driving non-linear loads.

BACKGROUND

An ideal AC power source is sinusoidal in nature. Non-linear loads (such as rectifiers and motor drives) introduce different frequencies into a power supply. These different frequencies are called harmonics.

Figure 1:
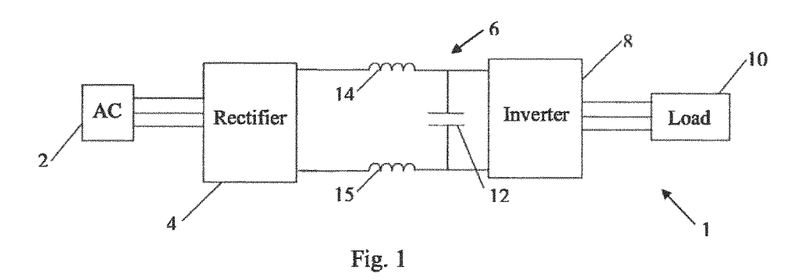
FIG. 1 shows a prior art system in which a load is driven by a under the control of an inverter.

FIG. 1 shows a system, indicated generally by the reference numeral 1, in which a load (such as a motor) is driven under the control of an inverter. The system 1 comprises a 3-phase AC power source 2, a 3-phase rectifier 4, a DC link section 6, an inverter 8 and a load 10. The DC link section 6 includes a DC link capacitor 12. A first inductor 14 is connected between a first output of the rectifier 4 and a first terminal of the DC link capacitor 12. A second inductor 15 is connected between a second output of the rectifier 4 and a second terminal of the DC link capacitor 12. The inductors 14, 15 (which are provided on the DC side of the rectifier 4) are sometimes referred to as DC chokes.

As is well known in the art, the AC supply voltage provided by the AC power source 2 is converted into a DC voltage that appears across the DC link capacitor 12. The inverter 8 converts the DC signal at the DC link capacitor into a controllable AC signal for driving the load 10 (that AC signal typically being controllable in amplitude, phase and frequency). Thus, the system 1 provides a controllable AC-AC converter for driving the load 10.

The rectifier 4 and the inverter 8 are both non-linear loads. Accordingly, the system 1 can cause significant harmonic currents to be introduced into the AC supply 2. The inductors 14 and 15 are provided to reduce higher frequencies components (i.e. harmonics) from being returned to the AC supply 2.

The use of inductors to reduce harmonics is well established. However, inductors can be large and expensive, particularly when seeking to filter relatively low frequency harmonic currents. Further, inductors can saturate at higher current levels. There remains a need for a system in which harmonic currents can be reduced in other ways.

The present invention seeks to address the problems outlined above. The principles of the present invention are applicable to motor drive applications (such as the applications described below). However, the principles of the invention can be applied to other many other applications, including, but not limited to, induction heating and arc furnace systems.

SUMMARY

The present invention provides a load driving circuit (for example for driving a motor) comprising: a rectifier (such as a 3-phase rectifier) having an input coupled to an AC supply (such as a 3-phase AC supply); a DC link stage (having an input coupled to the output of the rectifier and typically including one or more DC link capacitors maintaining a DC link voltage); an inverter having an input coupled to an output of the DC link stage and an output coupled to a load, wherein the inverter converts an output voltage of the DC link stage into a signal for driving the load (typically under the control of a control module); and an electronic inductor (provided between the rectifier and the DC link stage) configured to control the output voltage and/or output current of the DC link stage such that the current drawn from the AC supply by the load driving circuit has a stepped profile. In a typical use of the system, the DC link current of the (3-phase) rectifier is controlled (using the electronic inductor) is order to control the input current of the rectifier (i.e. the current drawn by the rectifier from the AC supply).

The present invention also provides a method comprising controlling an electronic inductor provided between a rectifier and a DC link stage of a load driving circuit such that the output voltage and/or output current of the DC link stage is controlled such that the current drawn from a 3-phase AC supply by the load driving circuit has a stepped profile.

In many forms of the invention, the stepped profile is mathematically equivalent to the sum of a first, second and third pulses having first, second and third phase offsets respectively. More specifically, the stepped profile may be given by:

$$\frac{A\cos(n30)}{n\pi} + \frac{B\cos(n\alpha 1)}{n\pi} - \frac{C\cos(n\alpha 2)}{n\pi},$$

wherein 30, α1 and α2 are the said first, second and third offsets respectively. It should be noted that each of the variables A, B and C can be positive or negative, such that a wide variety of shapes of stepped profiles can be described by the formula above.

In many forms of the invention, the stepped profile is given by:

$$\frac{4I_{dc1}\cos(n30)}{n\pi} + \frac{4I_{dc2}\cos(n\alpha 1)}{n\pi} - \frac{4I_{dc2}\cos(n\alpha 2)}{n\pi},$$

wherein $I_{dc1}$, $I_{dc2}$ and $-I_{dc2}$ are the amplitudes of the first, second and third pulses. In many forms of the invention, the variables $I_{dc1}$ and $I_{dc2}$ are both positive, but this is not essential; for example, either (or both) of those variables could be negative. Thus, the generation of the stepped profile can be very flexible.

By expressing harmonics mathematically, it is possible to select the variables of the equations outlined above such that particular harmonics are reduced or even eliminated. This can be used to reduce total harmonic distortion (THD) without requiring large DC chokes.

The stepped profile may be shaped such that, in a three-phase system, the sum of the stepped profile for each of the three phases is symmetrical.

The stepped profile may have a first portion and a second portion, the first and second portions being symmetrical, the first portion comprising a first projection and a second projection, wherein each projection has a duration θ, the first projection starting at a time β after the start of the pulse, the time between the first and second projections being 2β, and the time from the end of the second projection to the end of the portion of the pulse being is given by β. The said second portion may be the inverse of the first (thereby maintaining the symmetry of the pulse). In some forms of the invention, the first and second portions of the pulse each have a duration of 120 degrees such that 2β+θ=60.

The electronic inductor may be configured such that at least one harmonic component (such as the fifth and/or the seventh harmonic) of the current drawn from the AC supply is eliminated (or minimized). The electronic inductor may be configured to minimize or eliminate more than one harmonic (although this is not mathematically simple).

The load driving circuit may further comprise an LC filter between the AC supply and the/each rectifier.

The present invention also provides a system comprising a plurality of load driving circuits, each of the load driving circuits drawing current from a 3-phase AC supply and driving an AC load, wherein each of said load driving circuit comprises: a rectifier (such as a 3-phase rectifier) having an input coupled to the AC supply; a DC link stage having an input coupled to the output of the rectifier (and typically including one or more DC link capacitors maintaining a DC link voltage); and an inverter having an input coupled to an output of the DC link stage and an output coupled to the respective load, wherein the inverter converts a DC link voltage into a signal for driving the respective AC load (typically under the control of a control module), wherein: each DC link stage includes an electronic inductor configured to control the (output) voltage and/or (output) current of the DC link stage; and the rectifiers of the load driving circuits are arranged such that the rectification of at least some of the load driving circuits are staggered (thereby reducing the harmonic distortion at the AC supply). Thus, the timing of the plurality of rectifiers can be staggered such as the sum of the currents drawn from the AC supply has a lower harmonic content that the current drawn by each of the parallel load driving circuits.

The present invention further provides a method comprising controlling rectifiers of a plurality of load driving circuits arranged in parallel such that the rectification of at least some of the load driving circuits are staggered, wherein each of said load driving circuit comprises: a rectifier, a DC link stage, an inverter and an electronic inductor, the electronic inductor being configured to control the output voltage and/or output current of the DC link stage. The method may further comprises controlling the electronic inductor of each of the parallel load driving circuits such that the current drawn by that load driving circuit from an AC supply has a stepped profile. Indeed, the method may include any of the features of the method outlined above.

In some forms of the invention, each of the plurality of inverters drives a different load.

Each electronic inductor may be controlled such that substantially square wave current pulses are drawn from the AC supply by the respective load driving circuit.

In some forms of the invention, the rectifier circuits of at least some of the plurality of load driving circuits are thyristor-based (or SCR-based) rectifiers in which the thyristors (or SCRs) are controlled in order to provide said staggered rectification.

The invention may further comprise a control module for controlling the electronic inductors (in particular for controlling the rectifier pulse timings). The control module may be a central control module for all electronic inductors. Alternatively or in addition, a separate control module may be provided for each electronic inductor. Alternatively, or in addition, at least some of the electronic inductors may be in communication with other electronic inductors.

Thus, a variety of control methods for the electronic inductors are possible. In one embodiment, a fixed phase shift between different electronic inductors is provided. Alternatively, the phase shifts may be variable, depending on the operating conditions. The phase shifts may be adjustable in order to reduce overall THD or to control the magnitude of one or more particular harmonic(s). The phase shift values may be based on load conditions and/or power levels as stored in a look-up table.

The said electronic inductors may be configured to control the output voltage and/or output current of the DC link stage such that the current drawn from the AC supply by the load driving circuit has a stepped profile.

BRIEF DESCRIPTION OF THE DRAWINGS

The invention will now be described in further detail with reference to the following schematic drawings, in which.

DETAILED DESCRIPTION

Figure 2:
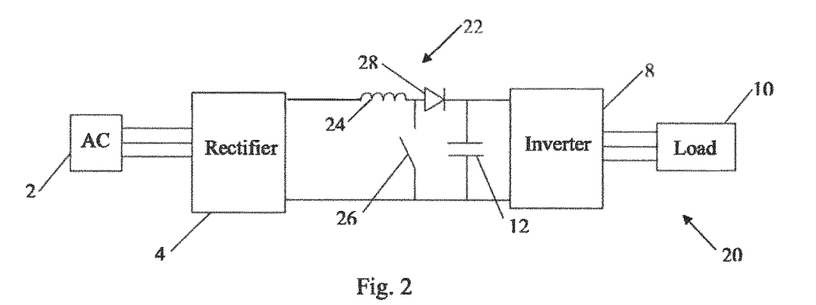
FIG. 2 shows a circuit in accordance with an aspect of the present invention in which a load is driven under the control of an inverter.

FIG. 2 shows a circuit, indicated generally by the reference numeral 20, incorporating some of the principles of the first embodiment of the present invention.

The circuit 20 includes the 3-phase AC supply 2, the 3-phase rectifier 4, the DC link capacitor 12, the inverter 8 and the load 10 described above with reference to the system 1. However, the DC inductors 14 and 15 are omitted and an electronic inductor, indicated generally by the reference numeral 22 is provided between the rectifier 4 and the DC link capacitor 12.

The electronic inductor 22 (which is known per se) comprises an inductor 24, a switch 26 and a diode 28. The switch 26 is typically implemented using a transistor (such as an IGBT). The electronic inductor can be used to precisely control the DC link current and voltage as desired in a way that is not possible using a pair of DC inductors. In particular, the electronic inductor can be used to control the DC link current in order to control the current drawn by the rectifier 4 from the AC supply. In addition, the electronic inductor can be made smaller and (in some applications) more cheaply than such DC inductors.

Figure 3:
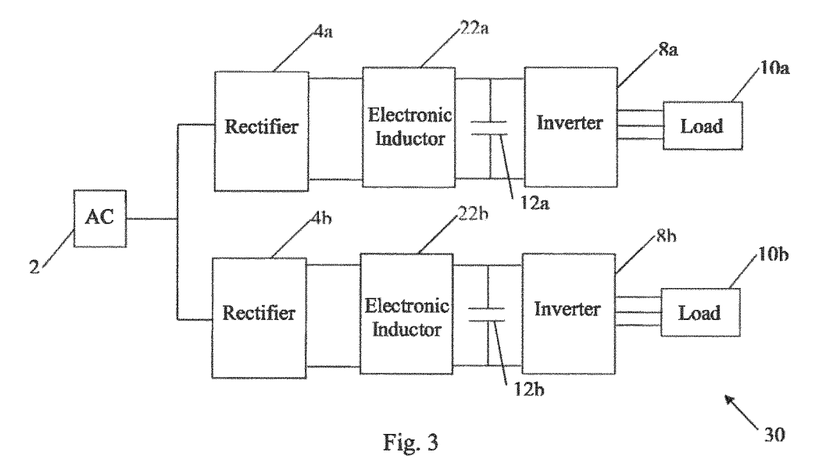
FIG. 3 is a block diagram of a system in accordance with an aspect of the invention in which multiple loads are driven.

FIG. 3 is a block diagram of a system, indicated generally by the reference numeral 30, in which a first load 10a and a second load 10b are driven in parallel.

The first load 10a is driven by a circuit comprising the AC supply 2, a 3-phase rectifier 4a, an electronic inductor 22a, a DC link capacitor 12a and an inverter 8a. Similarly, the second load 10b is driven by a circuit comprising the AC supply 2, a 3-phase rectifier 4b, an electronic inductor 22b, a DC link capacitor 12b and an inverter 8b. Thus, both the first load 10a and the second load 10b are driven by a circuit similar to the circuit 20 described above.

Figure 4:
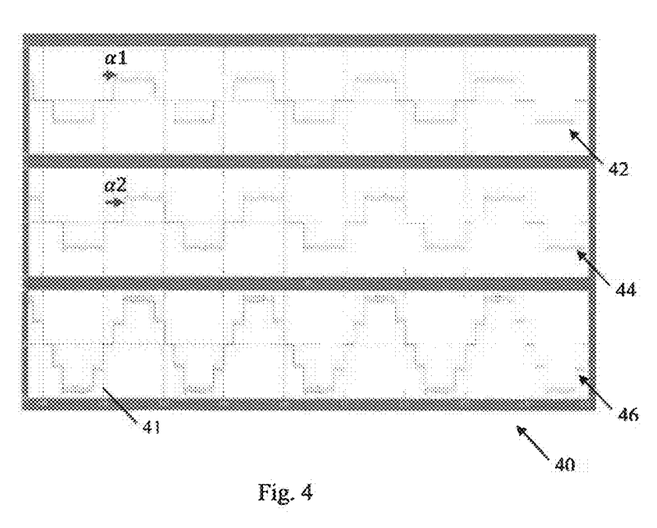
FIG. 4 shows results of a simulation of the circuit of FIG. 3.

FIG. 4 shows results, indicated generally by the reference numeral 40, of a simulation of an exemplary use of the circuit of FIG. 3.

The first line of the simulation 40 shows the current drawn (indicated by the reference numeral 42) from the AC supply by the rectifier 4a. As is well known in the art, when a 3-phase diode rectifier is used in conjunction with an AC power supply, the rectifier draws a positive pulse for 120 degrees of the 360 degree cycle and a negative pulse for 120 degrees of the 360 degree cycle. In between each positive and negative pulse is a 60 degree period when no current is drawn by the square wave current pulse from the AC supply. As shown in FIG. 4, an edge of the current 42 is shifted from an arbitrary reference time 41 by a phase $\alpha_1$.

The shape of the pulses in the current 42 is determined by the electronic inductor 22a. By controlling the switching of the electronic inductor 22a such that a constant current is drawn from the rectifier 4a, the square wave pulse 42 shown in FIG. 4 is drawn.

The second line of the simulation 40 shows the current drawn (indicated by the reference numeral 44) from the AC supply by the rectifier 4b. As with the current pulse 42, the rectifier 4b draws a positive pulse for 120 degrees of the 360 degree cycle and a negative pulse for 120 degrees of the 360 degree cycle. As shown in FIG. 4, an edge of the current 44 is shifted from an arbitrary reference time 41 by a phase $\alpha_2$. The rectifier 4b is controlled such that the pulse 44 is shifted relative to the pulse 42. In one embodiment of the invention, the pulse 44 is shifted by 30 degrees relative to the pulse 42 (but other phase shifts may be used in alternative embodiments of the invention).

The current pulses 42 and 44 are both drawn from the AC supply 2. The third line of the simulation 40 (indicated by the reference numeral 46) shows the sum of the currents 42 and 44 that are drawn from the AC supply 2. The current 46 can be expressed as follows (where $i_n$ is the current 46):

$$i_n = \frac{4I_{dc1}\cos(n\alpha 1)}{n\pi} + \frac{4I_{dc2}\cos(n\alpha 2)}{n\pi}$$

It is clear that the current 46 is more sinusoidal than the currents 42 and 44. Accordingly, the current 46 includes less harmonic distortion than the current 42 and 44 drawn by the rectifiers 4a and 4b respectively.

Mathematical modelling of the circuit 30 has shown that when the loads 10a and 10b draw the same power from the AC supply 2 and the rectifiers are controlled to have identical current waveforms with the exception of a phase shift (e.g. a 30 degree phase shift), the total harmonic distortion (THD) for the system 30 (which does not include an AC choke at the input side of the rectifiers) is about 17% for a broad range of load variations. Including a 1 mH AC choke at the input side of each rectifier reduces the THD to about 6%. Although it is difficult to generalise, the prior art circuit 1 described above might have a THDi of 45% or even higher (although this value is highly dependent on variables such as inductors sizes and load powers). Thus, the system 30 can be used to significantly reduce harmonic distortion.

The rectifier circuit 4 described above would typically be implemented using a diode bridge circuit. By replacing the diodes in the diode bridge circuit with silicon controlled rectifiers (SCRs) or thyristors, a rectifier circuit can be generated in which the phase can be controlled. Accordingly, a thyristor-based rectifier can be used to provide the phase shifting functionality of the 3-phase rectifiers 4a and 4b described above.

Figure 5:
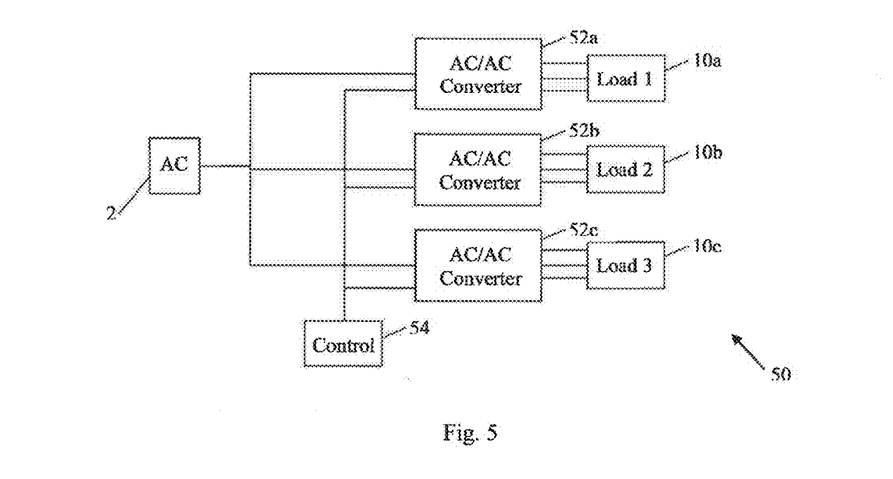
FIG. 5 is a block diagram of a system in accordance with an aspect of the present invention in which multiple loads are driven.

The system 30 described above includes a two loads operating in parallel that are controlled in order to reduce harmonic distortion. Clearly, the principles of the invention can be applied to any number of loads. By way of example, FIG. 5 is a block diagram of a system, indicated generally by the reference numeral 50, in which the AC supply is used to drive three loads (the loads 10a and 10b described above and a third load 10c). The system 50 includes a first AC-AC converter 52a (incorporating the rectifier 4a, electronic inductor 22a, DC link capacitor 12a and inverter 8a described above) driving the first load 10a and a second AC-AC converter 52b (incorporating the rectifier 4b, electronic inductor 22b, DC link capacitor 12b and inverter 8b described above) driving the second load 10c. A third AC-AC converter 52c is provided for driving the third load 10c.

The system 50 additionally comprises a control module 54 that is used to control the relative phases of the AC-AC converters 52a, 52b and 52c.

The system 50 may be configured to provide a fixed phase shift between the AC-AC converters (for example the second AC-AC converter 52b may have a phase shift of 15 degrees with respect to the first AC-AC converter 52a and the third AC-AC converter 52c may have a phase shift of 30 degrees with respect to the first AC-AC converter). However, by providing a control module 54, it is possible to define different phase shifts or even to enable the phase shifts to be variable, depending on the operating conditions of the system 50.

For example, in the event that the loads 10a, 10b and 10c are drawing significantly different currents, the optimum phase shift between the AC-AC converters to maximise THD reduction may not be 15 degrees. The system 50 is sufficiently flexible to be able to adjust the phase shift to maximise the THD reduction or to control the magnitude of any selected harmonic.

The system 50 includes the provision of a central control module 54. This is not essential to all forms of the invention. In the event that dynamic adjustment of the phase shift is not required, then the phase shift may be pre-set, such that a control module may not be needed. Further, an alternative form of control includes the AC-AC converter modules communicating with one another, rather than via the central control module 54. The skilled person will be aware of many control arrangements that could be provided. For example, using random phase shift values for multi-independent drive systems or using phase shift values that are determined based on load conditions and/or power levels using a look-up table.

The embodiments of the invention described above rely on the provision of multiple units in parallel in order to reduce the harmonic distortion introduced into a power supply. This effect is achieved by summing square pulses that are staggered in order to reduce the overall harmonic component of the summed pulse.

The inventor has realised that the harmonic components can be reduced even in circumstances where a single inverter and load is used by shaping the pulses drawn from a 3-phase AC supply.

Figure 6:
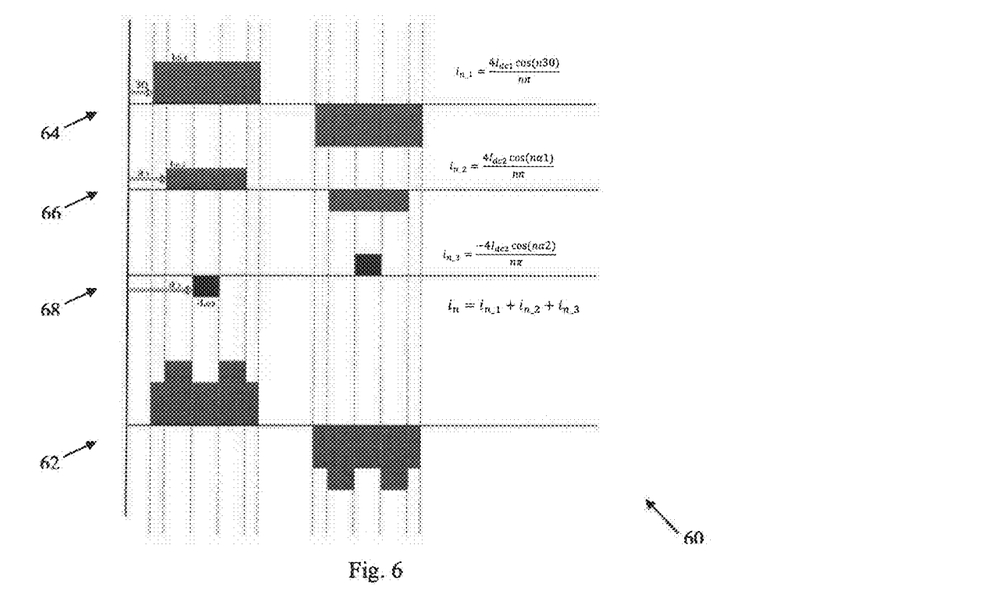
FIG. 6 shows the generation of a pulse in accordance with an aspect of the present invention.
Figure 7:
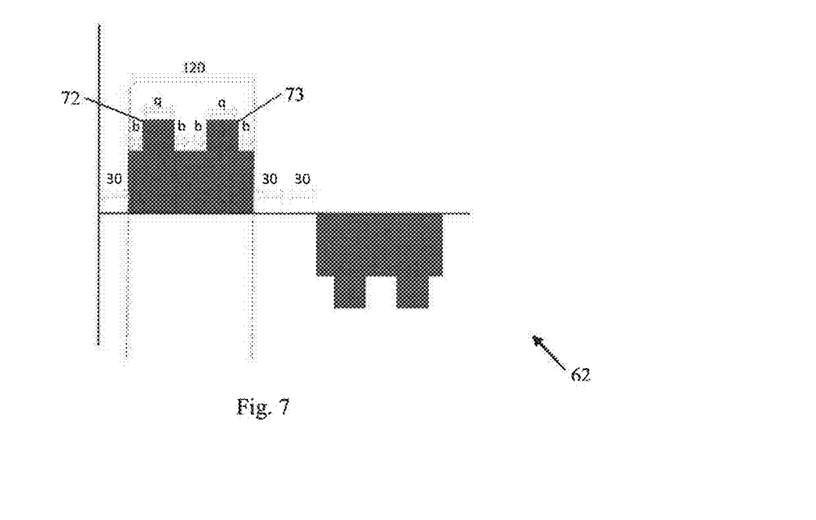
FIG. 7 shows further details of the pulse of FIG. 6.

FIG. 6 shows a pulse, indicated generally by the reference numeral 62, that may be drawn from the 3-phase AC source in accordance with a second embodiment of the present invention. The pulse 62 can be modelled as the sum of a first pulse 64, a second pulse 66 and a third pulse 68 that are also shown in FIG. 7.

The first current pulse 64 ($i_{n\_1}$) can be defined as:

$$i_{n\_1} = \frac{4I_{dc1}\cos(n30)}{n\pi}$$

The second current pulse 66 ($i_{n\_2}$) can be defined as:

$$i_{n\_2} = \frac{4I_{dc2}\cos(n\alpha1)}{n\pi}$$

The third current pulse 68 ($i_{n\_3}$) can be defined as:

$$i_{n\_3} = \frac{-4I_{dc2}\cos(n\alpha2)}{n\pi}$$

The overall pulse 62 ($i_n$) is simply the sum of the pulses 64, 66 and 68 and can be expressed as follows:

$$i_n = \frac{4I_{dc1}\cos(n30)}{n\pi} + \frac{4I_{dc2}\cos(n\alpha1)}{n\pi} - \frac{4I_{dc2}\cos(n\alpha2)}{n\pi}$$

The pulse 62 is flexible and can be adjusted by controlling the variables $I_{dc1}$, $I_{dc2}$, $\alpha1$ and $\alpha2$.

The fundamental input current magnitude and its harmonics can be calculated from the equation $i_n$.

By expressing particular harmonics mathematically, it is possible to select the variables of the equation (i.e. $I_{dc1}$, $I_{dc2}$, $\alpha1$ and $\alpha2$) such that the harmonics can be reduced (or even eliminated). For example, one or more of the 5$^{th}$ and 7$^{th}$ harmonics can be reduced to zero, as discussed further below. By manipulating the current pulses drawn from the AC supply in order to reduce the harmonics, the harmonic distortion introduced into the power supply can be reduced without requiring large DC inductors.

It should be noted that in the example described above, $I_{dc1}$ and $I_{dc2}$ are both positive. This is not essential. For example, $I_{dc2}$ could be negative. This gives a larger number of possibilities for generating the current waveforms.

The following equations show that we may be able to remove 5$^{th}$ and 7$^{th}$ harmonics and generate the desired load current. But the non-linear equation should be solved to find a reference current for the DC current. The first stage is to find the fundamental current value from the above equation.

$$i_1 = \frac{4I_{dc1}\cos(30)}{\pi} + \frac{4I_{dc2}\cos(\alpha1)}{\pi} - \frac{4I_{dc2}\cos(\alpha2)}{\pi}$$

The other equations can be defined based on low order harmonic cancellation:

$$i_5 = 0 = \frac{4I_{dc1}\cos(150)}{5\pi} + \frac{4I_{dc2}\cos(5\alpha1)}{5\pi} - \frac{4I_{dc2}\cos(5\alpha2)}{5\pi}$$

$$i_7 = 0 = \frac{4I_{dc1}\cos(210)}{7\pi} + \frac{4I_{dc2}\cos(7\alpha1)}{7\pi} - \frac{4I_{dc2}\cos(7\alpha2)}{7\pi}$$

Solving the first equation ($i_5$) would result in the fifth harmonic being zero. Solving the second equation ($i_7$) would result in the seventh harmonic being zero. Solving both equations at the same time (if that is mathematically possible) would result in both the fifth and the seventh harmonics being zero.

FIG. 7 shows further details of the pulse 62 in accordance with an embodiment of the present invention. The pulse 62 as shown in FIG. 7 is shaped in order to ensure that pulses in a three-phase system (where three pulses are provided 120 degrees apart) are symmetrical. The pulse 62 shown in FIG. 7 provides some mathematical limitations to that can used when solving the harmonic equations outlined above.

The overall positive pulse 62 is a 120 degree pulse. This is a requirement of the rectification process in which the pulse is to be used (as discussed above). The pulse 62 has a stepped form with two symmetrical projections labelled 72 and 73 in FIG. 7. As shown in FIG. 7, the time from the start of the pulse to the start of the first projection is given by $\beta$, each projection lasts a time $\theta$, the time between the two projections is given by $2\beta$, and the time from the end of the second projection to the end of the pulse is given by $\beta$.

Since the entire pulse has a duration of 120 degrees, it can be stated that:

$$120 = \beta+\theta+\beta+\theta+\beta = 4\beta+2\theta$$

This can be reduced to the following simple restriction to the harmonic elimination equations set out above: $2\beta+\theta=60$.

Figure 8:
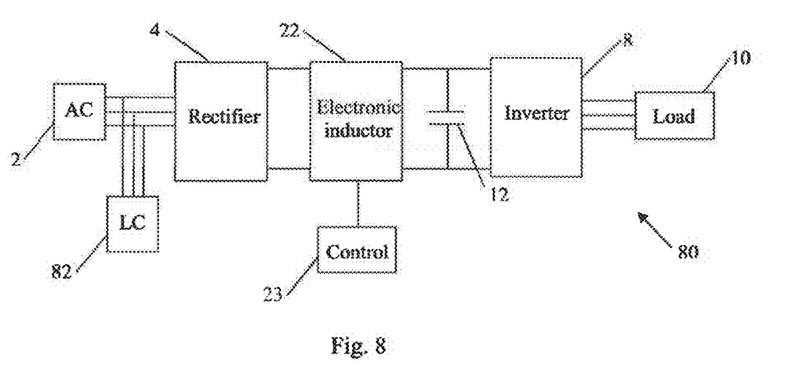
FIG. 8 is a block diagram of a system in accordance with an aspect of the present invention in which a load is driven under the control of an inverter.

FIG. 8 is a block diagram of a system, indicated generally by the reference numeral 80, in accordance with an aspect of the present invention. The system 80 comprises the AC supply 2, the 3-phase rectifier 4, the electronic inductor 22, the DC link capacitor 12, the inverter 8 and the load 10 described above with reference to the system 20. A control module 23 is coupled to the electronic inductor 22 and is used to control the DC link voltage and current such that the desired pulse shape (as described above with reference to FIGS. 6 and 7) is drawn from the AC supply 2 by the rectifier 4. By selecting the variables $I_{dc1}$, $I_{dc2}$, $\alpha1$ and $\alpha2$ it is possible to minimise or eliminate one or more selected harmonics (such as the fifth and seventh harmonics, as described above).

An optional LC filter 82 is provided on the AC side of the input rectifier 4 to filter out a selected harmonic frequency. For example, the pulse shape could be selected to reduce the fifth and seventh harmonics, with the LC filter selected to reduce the eleventh harmonic.

Figure 9:
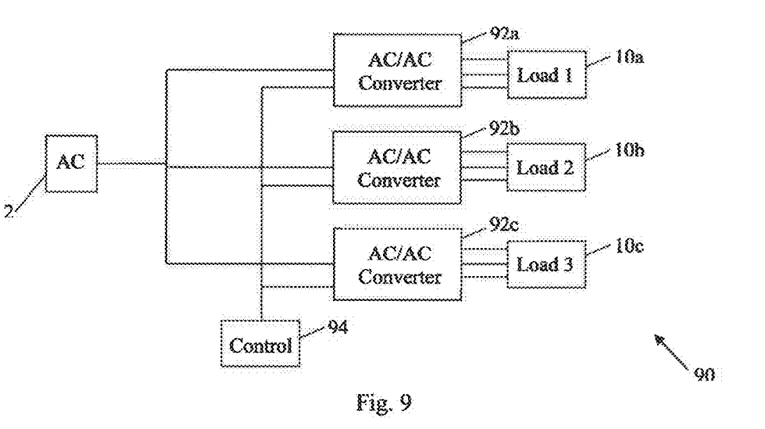
FIG. 9 is a block diagram of a system in accordance with an aspect of the present invention in which multiple loads are driven.

FIG. 9 is a block diagram of a system, indicated generally by the reference numeral 90. The system 90 combines the principles of the system 50 (in which the AC-AC converter phases are staggered) and the system 80 (in which the pulse provided by an AC converter is shaped).

The system 90 comprises the 3-phase AC supply 2, the first load 10a, the second load 10b and the third load 10c described above with reference to FIG. 5. The system 50 includes a first AC-AC converter 92a (incorporating an instance of the rectifier 4, electronic inductor 22, control module 23, DC link capacitor 12 and inverter 8 described above with reference to FIG. 8) driving the first load 10a and a second AC-AC converter 52b (also incorporating an instance of the rectifier 4, electronic inductor 22, control module 23, DC link capacitor 12 and inverter 8 described above) driving the second load 10b and a third AC-AC converter 52c (also incorporating an instance of the rectifier 4, electronic inductor 22, control module 23, DC link capacitor 12 and inverter 8 described above) driving the third load 10c.

The system 90 additionally comprises a control module 94 that is used to control the relative phases of the AC-AC converters 52a, 52b and 52c and is therefore similar to the control module 54 described above.

Of course, the control module 94 may be omitted and the control functionality can be provided in any suitable manner (for example using pre-set functionality or by allowing the various AC-AC converters to be able to communicate with one another). Furthermore, although three loads are shown in FIG. 9, the principles of the invention can be applied to systems having any number of loads.

The principles of the present invention can be applied in many circumstances and are flexible. For example, consider a container ship having many (perhaps hundreds) of containers that include cooling modules controlled by a motor drive. The rectifiers of the various containers may be arranged to operate at a different phase to reduce the harmonic noise introduced into the power supply. In addition, some or all of the containers may be configured to shape the current pulses drawn from power supply to further reduce the harmonic noise. Furthermore, one or more filtering arrangements may be provided to yet further reduce harmonic noise.

The embodiments of the invention described above are provided by way of example only. The skilled person will be aware of many modifications, changes and substitutions that could be made without departing from the scope of the present invention. For example, although the systems described above with reference to FIGS. 5 and 9 show three loads, the principles of the present invention are applicable to systems incorporating any number of loads. The claims of the present invention are intended to cover all such modifications, changes and substitutions as fall within the spirit and scope of the invention.

What is claimed is:

1. A load driving circuit comprising:
a 3-phase rectifier having an input coupled to a 3-phase AC supply;
a DC link stage;
an inverter having an input coupled to an output of the DC link stage and an output coupled to a load, wherein the inverter converts an output voltage of the DC link stage into a signal for driving the load; and
an electronic inductor configured to control the output voltage and/or output current of the DC link stage such that the current drawn from the AC supply by the load driving circuit has a stepped profile;
wherein said stepped profile is mathematically equivalent to the sum of a first, second and third pulses having first, second and third phase offsets respectively;
wherein said stepped profile is given by:

$$\frac{4I_{dc1}\cos(n30)}{n\pi} + \frac{4I_{dc2}\cos(n\alpha 1)}{n\pi} - \frac{4I_{dc2}\cos(n\alpha 2)}{n\pi},$$

wherein $I_{dc1}$, $I_{dc2}$ and $-I_{dc2}$ are the amplitudes of the first, second and third pulses.

2. The load driving circuit as claimed in claim 1, wherein 30, α1 and α2 are the said first, second and third offsets respectively.

3. The load driving circuit as claimed in claim 1, wherein the stepped profile is shaped such that, in a three-phase system, the sum of the stepped profile for each of the three phases is symmetrical.

4. The load driving circuit as claimed in claim 1, wherein the stepped profile has a first portion and a second portion, the first and second portions being symmetrical, the first portion comprising a first projection and a second projection, wherein each projection has a duration θ, the first projection starting at a time β after the start of the pulse, the time between the first and second projections being 2β, and the time from the end of the second projection to the end of the portion of the pulse being given by β.

5. The load driving circuit as claimed in claim 4, wherein the first and second portions of the pulse each have a duration of 120 degrees such that 2β+θ=60.

6. The load driving circuit as claimed in claim 1, wherein the electronic inductor is configured such that at least one harmonic of the current drawn from the AC supply is eliminated.

7. A system comprising a plurality of load driving circuits, each of the load driving circuits drawing current from a 3-phase AC supply and driving an AC load, wherein each of said load driving circuit comprises:
a 3-phase rectifier having an input coupled to the AC supply;
a DC link stage having an input coupled to the output of the rectifier; and
an inverter having an input coupled to an output of the DC link stage and an output coupled to the respective load, wherein the inverter converts a DC link voltage into a signal for driving the respective AC load,
wherein:
each DC link stage includes an electronic inductor configured to control the output voltage and/or output current of the DC link stage; and
the rectifiers of the load driving circuits are arranged such that the rectification of at least some of the load driving circuits is staggered.

8. The system as claimed in claim 7, wherein each of the plurality of inverters drives a different load.

9. The system as claimed in claim 7, wherein each electronic inductor is controlled such that substantially square wave current pulses are drawn from the AC supply by the respective load driving circuit.

10. The system as claimed in claim 7, wherein the rectifiers of at least some of the plurality of load driving circuits are thyristor-based rectifiers in which the thyristors are controlled in order to provide said staggered rectification.

11. The system as claimed in claim 7, further comprising a control module for controlling the electronic inductors.

12. The system as claimed in claim 7, wherein at least some of the electronic inductors are in communication with other electronic inductors.

13. The system as claimed in claim 7, wherein each of said load driving circuits is a load driving circuit.

14. A method comprising controlling an electronic inductor provided between a 3-phase rectifier and a DC link stage of a load driving circuit such that the output voltage and/or output current of the DC link stage is controlled such that the current drawn from a 3-phase AC supply by the load driving circuit has a stepped profile, wherein said stepped profile is mathematically equivalent to the sum of a first, second and third pulses having first, second and third phase offsets respectively;

wherein said stepped profile is given by:

$$\frac{4I_{dc1}\cos(n30)}{n\pi} + \frac{4I_{dc2}\cos(n\alpha 1)}{n\pi} - \frac{4I_{dc2}\cos(n\alpha 2)}{n\pi},$$

wherein $I_{dc1}$, $I_{dc2}$ and $-I_{dc2}$ are the amplitudes of the first, second and third pulses.

15. A method comprising controlling rectifiers of a plurality of load driving circuits arranged in parallel such that the rectification of at least some of the load driving circuits are staggered, wherein each of said load driving circuits comprises: a 3-phase rectifier, a DC link stage, an inverter and an electronic inductor, the electronic inductor being configured to control the output voltage and/or output current of the DC link stage.

16. The method as claimed in claim 15, further comprising controlling the electronic inductor of each of the parallel load driving circuits such that substantially square wave current pulses are drawn from the AC supply by the respective load driving circuit.

17. The method as claimed in claim 15, further comprising controlling the electronic inductor of each of the parallel load driving circuits such that the current drawn by that load driving circuit from a 3-phase AC supply has a stepped profile.

\* \* \* \* \*